Nov. 10, 1925.

M. P. CHAPLIN 1,560,760

ENGINE CONTROL MEANS

Filed Oct. 26, 1922

Inventor:
Merle P. Chaplin.
by ... Atty.

Nov. 10, 1925.
M. P. CHAPLIN
1,560,760
ENGINE CONTROL MEANS
Filed Oct. 26, 1922.
3 Sheets-Sheet 2
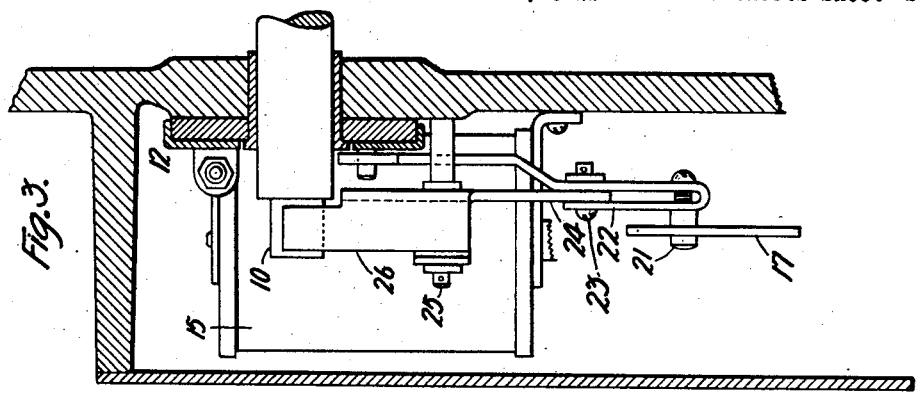
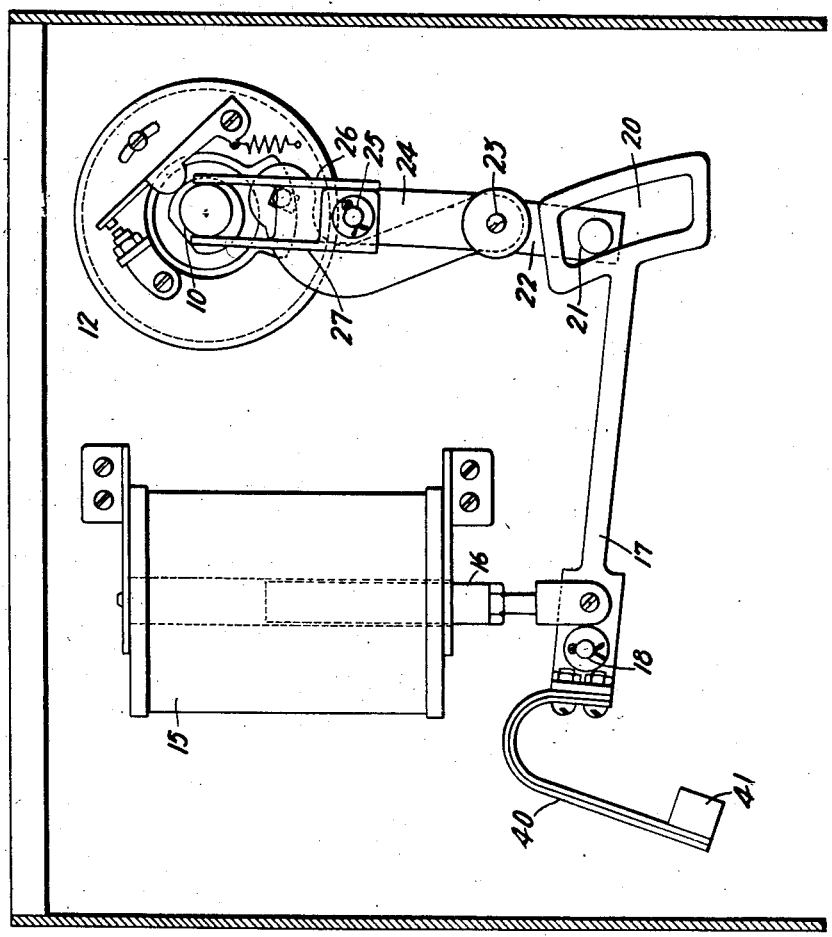
Inventor:
Merle P. Chaplin.
by Joel C. R. Palmer
Att'y.

Nov. 10, 1925.
M. P. CHAPLIN
ENGINE CONTROL MEANS
Filed Oct. 26, 1922    3 Sheets-Sheet 3
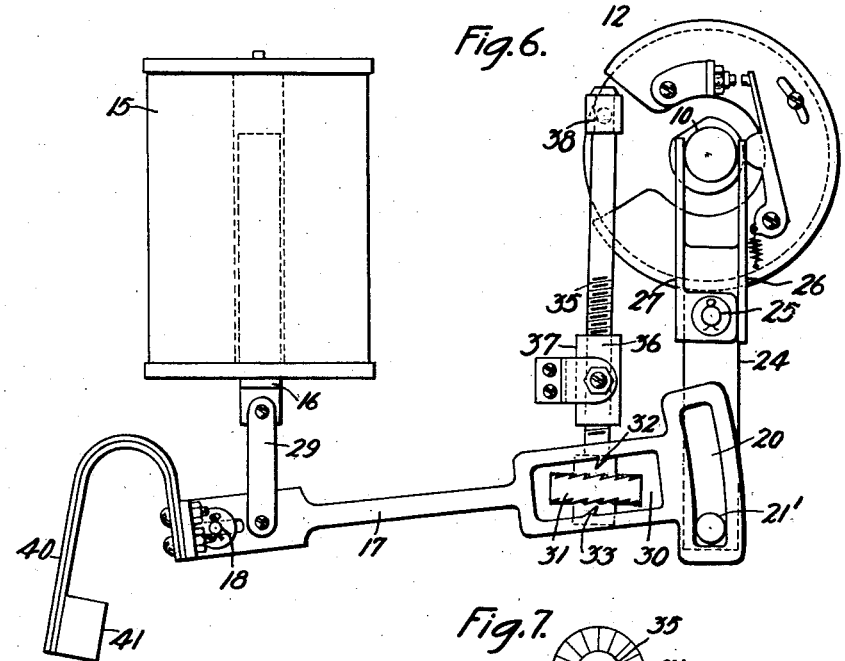
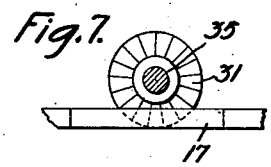
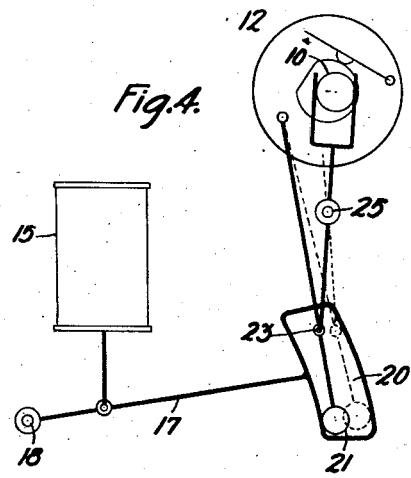
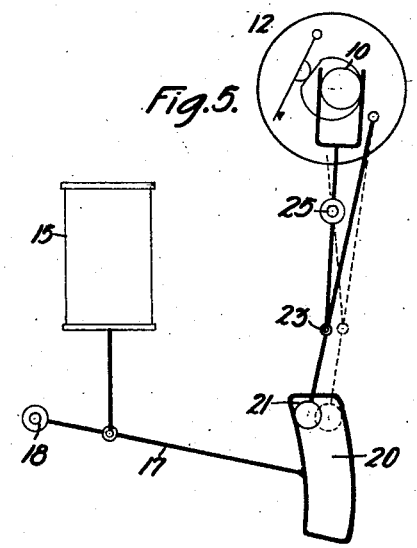
Inventor:
Merle P. Chaplin
by Joel C. Palmer
Att'y.

Patented Nov. 10, 1925.

1,560,760

UNITED STATES PATENT OFFICE.

MERLE PEABODY CHAPLIN, OF WHITE PLAINS, NEW YORK, ASSIGNOR TO WESTERN ELECTRIC COMPANY, INCORPORATED, OF NEW YORK, N. Y., A CORPORATION OF NEW YORK.

ENGINE-CONTROL MEANS.

Application filed October 26, 1922. Serial No. 596,938.

*To all whom it may concern:*

Be it known that I, MERLE PEABODY CHAPLIN, a citizen of the United States of America, residing at White Plains, in the county of Westchester, State of New York, have invented certain new and useful Improvements in Engine-Control Means, of which the following is a full, clear, concise, and exact description.

This invention relates to speed control devices for an internal combustion engine operating a dynamo electric machine.

The object of this invention is to provide a simple and efficient speed regulating means for the engine, the operation of which will result in maintaining the voltage of the generator practically constant for all loads.

In accordance with the general features of this invention means are provided whereby the timer of the engine is positively moved in both directions under the control of a voltage responsive solenoid and by power derived directly from the engine itself.

Certain embodiments of the invention are shown in the accompanying drawings.

Fig. 2 is a detail view of one form of control means.

Fig. 3 is a side view of the same.

Fig. 4 is a diagrammatic view of this mechanism when the spark is retarded.

Fig. 5 is a diagrammatic view of the same mechanism when the spark is advanced.

Fig. 6 is a detail view of another form of control means.

Fig. 7 is a top view of the ratchet mechanism in this control means.

Figure 1:
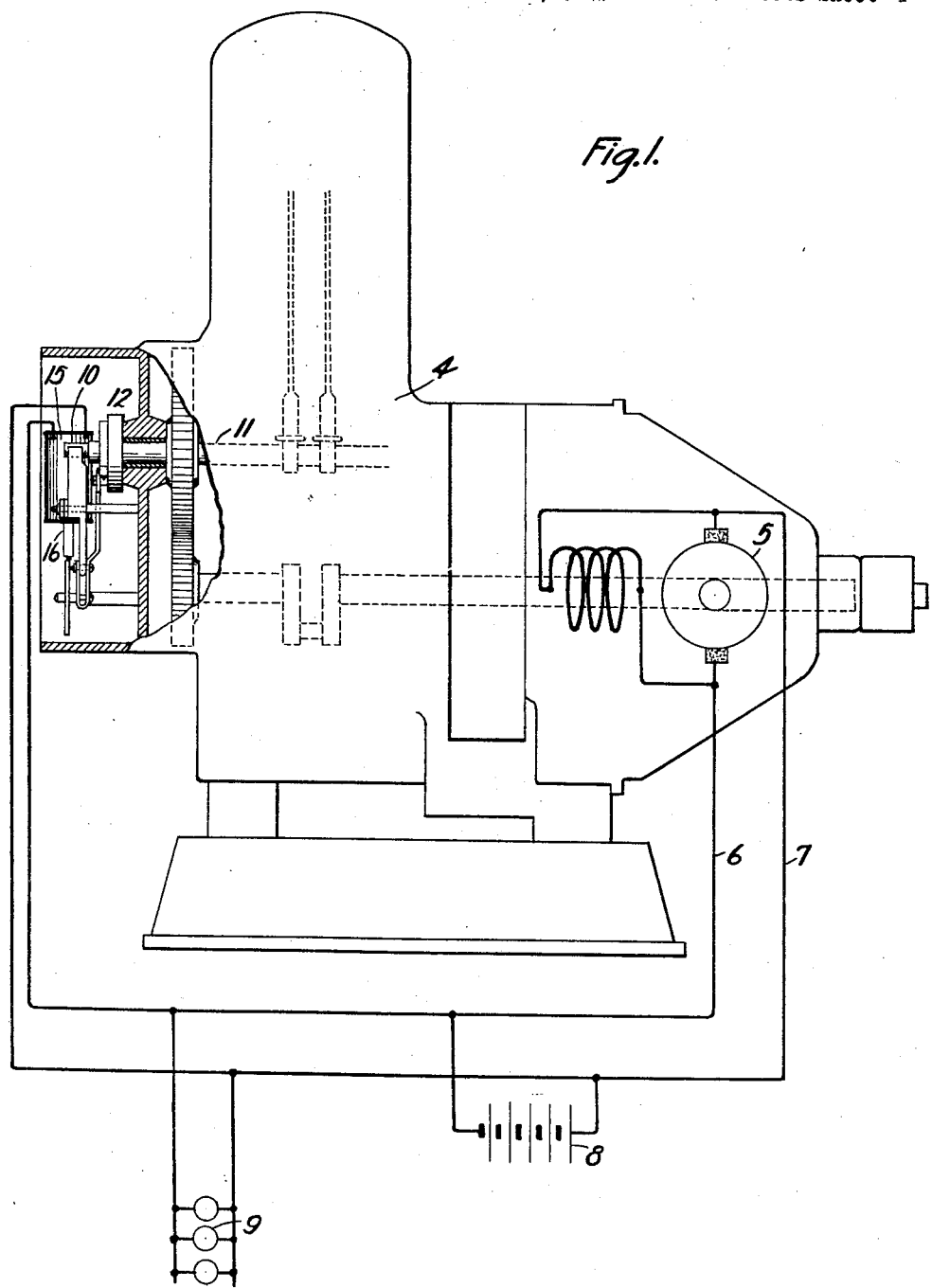
Fig. 1 is an assembly view of the internal combustion engine and generator showing the circuit connections of the generator and parts of the timer mechanism and control means.

An internal combustion engine 4 operates a dynamo electric machine 5, which provides current for a load circuit comprising lines 6 and 7 and having a battery 8 and a load 9 such as a number of electric lights connected in shunt thereof. About the end 10 of the cam shaft 11 of the engine is the usual timer mechanism 12 which operates the ignition under control of the end 10 which is formed as a cam member. Connected in shunt of lines 6 and 7 is a voltage responsive solenoid 15, operating on a plunger 16. Attached to the plunger is a bar 17, (Fig. 2) pivoted at 18 and having a wide end with a long biased opening therein. Fitting loosely within this slot is a circular projection 21 from a lever 22. The diameter of projection 21 is somewhat less in width than opening 20. The opposite end of lever 22 is attached to the timer mechanism 12 so that it may rotate the same to adjust the spark of the engine. Attached to lever 22 at 23 is a bar 24 pivoted at 25 and having extensions 26 and 27 which bear against opposite sides of cam 10 so that the rotations of this cam cause bar 24 to be continually oscillated upon pivot 25. This oscillating movement is transmitted to the lever 22 attached to bar 24 at 23. Normally this oscillating force is expended in causing the oscillation of the lower end of bar 22 and projection 21; but, when this projection is held against oscillation, movement is transmitted to the upper end of bar 22 and timer 12. The opening 21 is so biased that, if the bar 17 is raised or lowered by the action of the solenoid, the oscillation of lever 22 and projection 21 in either one direction or the other is prevented.

Let it be supposed that the mechanism is in the position shown in Fig. 2, that the lower end of lever 22 and projection 21 have just oscillated to the left, and that part of the load at 8 is removed so as to allow the engine to speed up, thereby increasing the potential difference between 6 and 7. The energization of solenoid 15 is thereupon increased, tending to draw in plunger 16 and to raise bar 17. The weak current in the solenoid, however, is unable to overcome the pressure of projection 22 on the left hand surface of opening 20, so that no effect is produced by the energization of the solenoid until the oscillation of projection 21 to the right allows the raising of bar 17. As the bar rises the left hand surface of opening 20 again bears against projection 21 so that the latter cannot oscillate toward the left. When the operation of rotating cam 10 forces bar 24 to the left tending to move lever 22 to the left, the lower end of this lever is held against rotation by bar 17 and pivot 18, while its upper end is carried to the left so as to rotate timer 12 in a clockwise direction to retard the spark of the engine. The speed of the latter is thus reduced sufficiently so that the terminal voltage of the generator 5 is returned to normal.

When an additional load is introduced into the circuit at 9, the engine slows down and the terminal voltage of the dynamo is decreased; whereupon the energization of the solenoid is decreased, and the plunger 16 and bar 17 are allowed to fall so as to cause bar 24 to push the upper portion of lever 22 to the right and to rotate timer 12 in a counter clockwise direction, advancing the spark, and speeding up the engine. Figs. 4 and 5 show clearly the method of operation of the mechanism.

By this invention, then the timer control mechanism may be made responsive to very small currents inasmuch as the solenoid has to exert only enough power to adjust plunger 16 and bar 17, while the timer itself is positioned by the pressure which cam 10 during its rotation exerts through extension 26 or 27, bar 24, lever 22, projection 21, bar 17 and pivot 18.

For the arrangement as shown in Fig. 2, any mechanism which will accomplish the same result may be substituted. Fig. 6 shows one such arrangement. Here, a projection 21' on bar 24 fits into opening 20 in bar 17 and has a diameter approximately equal to the width of this opening. Bar 17 is attached to plunger 16 by means of a swinging bar 29, and is so mounted at fixed pivot 18 that it may oscillate horizontally a distance equal to the oscillation of projection 21'. Bar 17 has a second, and rectangular, opening 30 therein between plunger 16 and opening 20. One side of a double-crown wheel 31 projects into this opening. Its toothed edges are adapted to bear against either a pawl 32 pointed in one direction and projecting from the upper side of opening 30, or pawl 33 pointed in the other direction and projecting from the lower side of the opening 30. Wheel 31 is supported upon a rod 35, screwed through a sleeve 36 pivoted on a fixed piece 37, and attached to the timer 12 by means of a pin 38, so as to rotate the timer as it is screwed downwardly or upwardly.

The operation of this device is similar to that of the arrangement shown in Fig. 2. As bar 24 oscillates, it will cause the oscillation of bar 17. When the solenoid 15 is lifting plunger 16, pawl 33 will bear against the bottom teeth of wheel 31, and at each oscillation of bar 17 will, for instance, turn the wheel so that the rod will be screwed upwardly through sleeve 37 to turn the times in a clockwise direction. When on the other hand the solenoid is deenergized and allows the plunger to fall, the reverse will be true.

In order to compensate for the loss in pulling power of the solenoid when it is heated by the heat of the engine or by other causes, a compensating bar 40 made of heat responsive metals and carrying a counter weight 41 may be attached to end of pivoted bar 17 opposite to opening 20 so that, as the heat is increased, the compensating bar will bend outwardly carrying the counterweight further from pivot 18 to facilitate lifting the opposite end of bar 17 by the weakened solenoid.

The invention claimed is:

1. A prime mover, a dynamo electric machine driven thereby, a timer for the prime mover, means actuated by the shaft of the prime mover for imparting an advance or retard movement to said timer and an electro-magnet for controlling the extent of movement of said timer, said electro-magnet being controlled by the voltage generated.

2. A dynamo electric machine, an internal combustion engine for operating the dynamo electric machine, an electric circuit for the dynamo electric machine, a timer for the internal combustion engine, a voltage responsive solenoid across said circuit, a lever continuously oscillated by the engine shaft for moving the timer for regulating the terminal voltage of the dynamo, said lever being actuated in accordance with the energization of the solenoid.

3. In a prime mover dynamo plant, an internal combustion engine, a generator driven thereby, an electric circuit for the generator, a timer for the engine, a cam member driven by the engine and operating the timer, bar and lever members oscillated by the cam member and connected to the periphery of the timer, a voltage responsive solenoid across said circuit operating a plunger, and a pivoted bar member attached to the plunger for adjusting the timer through the agency of the oscillations of the bar and lever members so as to regulate the speed of the engine.

4. A dynamo electric machine, a prime mover to operate the dynamo electric machine, a timer mechanism for the prime mover, a solenoid responsive to the terminal voltage of the dynamo electric machine, means including the timer mechanism and the solenoid for regulating the speed of the prime mover and the terminal voltage in the dynamo electric machine, and a compensating device associated with said means to overcome the effect of temperature changes upon the solenoid.

5. In a prime mover timer plant, an internal combustion engine, a generator driven thereby, an electric circuit for the generator, a timer for the engine, a cam member driven by the engine and operating the timer, bar and lever members operated by the cam member and connected to the periphery of the timer, a voltage responsive solenoid across said circuit operating a plunger, a pivoted bar member attached to the plunger for adjusting the timer through the agency of oscillations of the bar and lever members so as to regulate the speed of the engine and a bent bar of heat responsive metal attached to said pivoted bar member to overcome the effect of temperature changes upon the solenoid.

In witness whereof, I hereunto subscribe my name this 24th day of October A. D., 1922.

MERLE PEABODY CHAPLIN.